United States Patent
Vaccaro et al.

(10) Patent No.: US 8,125,965 B1
(45) Date of Patent: Feb. 28, 2012

(54) WIRELESS MULTI-MODE SYSTEM AND METHOD

(75) Inventors: Thomas Vaccaro, Encinitas, CA (US);
Marshall Ireland, San Diego, CA (US);
Don Timms, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1031 days.

(21) Appl. No.: 11/313,109

(22) Filed: Dec. 19, 2005

(51) Int. Cl.
*H04W 4/00* (2009.01)
*H04M 7/00* (2006.01)

(52) U.S. Cl. ......................... 370/338; 379/219
(58) Field of Classification Search .................. 370/338
See application file for complete search history.

(56) References Cited

U.S. PATENT DOCUMENTS

| | | | |
|---|---|---|---|
| 7,269,430 B2 * | 9/2007 | Moorti et al. ................. | 455/458 |
| 2005/0130611 A1 * | 6/2005 | Lu et al. ......................... | 455/130 |
| 2006/0187900 A1 * | 8/2006 | Akbar ............................ | 370/352 |

OTHER PUBLICATIONS

Junxion Box™ cellular router, copyrighted 2004-2007, 3 pages.*
Internet Document: "The Seattle Times: Business & Technology: Wireless Junxion Box will make auditors' lives easier" http://seattletimes.nwsource.com/html/businesstechnology (accessed Apr. 11, 2005).

* cited by examiner

*Primary Examiner* — Patrick Edouard
*Assistant Examiner* — Huy C Ho

(57) ABSTRACT

A multi-mode combination broadband wireless card and router system includes a broadband wireless card for broadband wireless data communication with a WAN over a broadband wireless link; a router for routing network communications between the WAN and a LAN, the router including a USB port for making a USB connection with a user computer, a wired LAN port for making a wired LAN connection with a user computer, and a wireless LAN port for making a wireless LAN connection with a user computer; at least one of the broadband wireless card and router including a processor; and a module executed by the processor, the module configured to: identify use of at least one of the USB port, the wired LAN port, and the wireless LAN port, and modify network access mode for one or more of the user computers based on the identification.

18 Claims, 3 Drawing Sheets

WIRELESS MULTI-MODE SYSTEM AND METHOD

FIELD OF THE INVENTION

The present invention relates to the field of wireless communication devices. More specifically, the invention relates to broadband wireless data cards and wireless router devices.

BACKGROUND OF THE INVENTION

With the advent of the global information network, known as the "Internet," the capability of connecting to and accessing the resources available on the Internet has increased in recent years. For example, Internet service providers ("ISPs") provide moderate access speed to the Internet over analog telephone lines, and increased "broadband" speed is available over digital subscriber lines ("DSL") and cable modem connections. Other high-speed data lines are also known.

In general, wired high-speed connections, such as those available via DSL and cable services, can be configured to be shared by a group of computers without dramatically affecting the perceptible performance of any one computer in the group. For example, routers are capable of sharing a single Internet connection among a network of computers, thereby allowing each computer in the network to access resources on the Internet. Unfortunately, current Internet access sharing devices, such as routers, have a number of drawbacks. Most significantly, known routers are generally limited to fixed connection points. Thus, a router capable of sharing DSL or cable connections requires a connection to the DSL or cable line, typically via a DSL or cable modem. Since, DSL and cable lines are established at fixed locations, the usefulness of such an Internet access sharing arrangement is limited to a geographic region proximate the fixed location.

More recently, the capabilities of connecting to and accessing the Internet has been implemented in certain wireless communication devices, such as mobile phones. However, mobile phones are generally regarded as standalone devices, where access to Internet resources is typically carried out directly via the mobile phone interface, i.e., via applications executed on the mobile phone. Currently, however, the use of mobile phones for accessing resources from Internet has been limited for a variety of reasons. One reason is that the data rate (or bandwidth) provided to most wireless communications devices is typically limited. Secondly, mobile phones have small displays, thereby limiting the viewing of large documents. Third, the limited controls available on mobile phones make navigation and data entry cumbersome. These and other factors negatively impact the user's experience in accessing Internet resources on the mobile phone.

Furthermore, although some mobile phones can be connected to a computer via a special cable or interface (e.g., a PCMCIA mobile phone), use of the mobile phone for connecting to the Internet in this fashion is generally limited to and intended for a single computer user. This is because of the enduring understanding in the field of wireless communication devices that mobile phones and their adapter variants, such as PCMCIA mobile phones, are single-user standalone devices.

Kyocera Wireless Corp. has proposed an evolution data only (EVDO) card for a wireless router. The combination of the EVDO card with a wireless router allows a single high-speed wireless Internet connection to be shared by a network of computers, allowing each computer in the network to access resources on the Internet, without being limited to a fixed connection point.

A problem recognized by the present inventors is an issue of customer support when combining an EVDO card with a wireless router. For example, if one purchases an EVDO card from a wireless carrier for one's personal computer, the wireless carrier provides the user with a manual and unified instructions on how to install and configure EVDO card and how to get support from the wireless carrier on the EVDO card installed in the personal computer. The wireless carrier also trains its customer service representatives on the same configuration information so that customer support can be provided to the user of the EVDO card. Similarly, if one purchases a wireless router for one's home, for example, from a router provider, the router provide supplies the user with a manual and unified instructions on how to install and configure the wireless router and how to get support from the router provider on the wireless router. The router provider also trains its customer service representatives on the same configuration information to so that customer support can be provided to the user of the wireless router.

The problem recognized by the inventors is that a determination has to be made as to which configuration model is used when the EVDO card is plugged into the wireless router. If the EVDO user is following the router provider configuration instructions and calls the EVDO wireless carrier (even if the router provider added support for the EVDO card), customer support for the EVDO wireless carrier can not help the user since the wireless carrier only knows EVDO wireless configuration instructions. Similarly, if the user is following the EVDO wireless carrier configuration instructions and calling the router provider, the router provider can not help the user.

Because customer support is a critical element in the success of the EVDO card and wireless router combination, the present invention addresses a solution for resolving this configuration support paradox within the device itself.

SUMMARY OF THE INVENTION

Accordingly, an aspect of the invention involves an EVDO/router system ("system") that makes either the EVDO wireless carrier configuration interface or the wireless router configuration interface available to the user, depending on how the user connects their computer to the system. The system detects which type of port the computer is connected to (this is the administrative computer, not any computer on the local network), and provides the appropriate configuration interface based on the port detected. Wireless routers typically have three methods of connection to the local area network (LAN) and typically one method of connection to the wide area network (WAN) (e.g., Internet). In the system, the WAN connection is through an EVDO wireless link, and the LAN connections are a) 802.11 wireless, b) 100 base T (wired internet), and/or c) USB. The system controls which configuration interface is seen (i.e., EVDO wireless carrier configuration interface or the wireless router configuration interface) depending on the connection used. The system uses the wireless router configuration interface if the user is connected through the 802.11 wireless LAN connection or the 100 base T LAN connection. If the user connects through the USB connection, the user will see an interface equivalent to the one used if the EVDO card was plugged directly into the computer. As a result, if the user calls customer support for the wireless router, they are provided support for configuring the product if their computer is connected either by either the 802.11 wireless LAN connection or the 100 base T LAN connection. If the user calls customer support for the EVDO wireless carrier, they are provided support for configuring the product if their computer is connected by the USB connection.

In the above aspect of the invention the multimode system provides alternate interfaces to the user depending on how the user's computer is connected to the wireless router. In another, broader aspect of the invention, the multimode system provides alternate modes to the user depending on how the user's computer is connected to the wireless router. This aspect of the invention involves a multi-mode combination broadband wireless card and router system. The system includes a broadband wireless card for broadband wireless data communication with a WAN over a broadband wireless link; a wireless router for routing network communications between the WAN and a LAN, the router including a USB port for making a USB connection with a user computer, a wired LAN port for making a wired LAN connection with a user computer, and a wireless LAN port for making a wireless LAN connection with a user computer; at least one of the broadband wireless card and wireless router including a processor; and a module executed by the processor, the module configured to: identify use of at least one of the USB port, the wired LAN port, and the wireless LAN port, and modify network access mode for one or more of the user computers based on the identification.

Another aspect of the invention involves a multi-mode system for broadband wireless data communication with a wide area network over a wireless link and for use with a router for routing network communications between the wide area network and a local area network, the router including a USB port for making a USB connection with a user computer, a wired LAN port for making a wired LAN connection with a user computer, and a wireless LAN port for making a wireless LAN connection with a user computer. The system includes a processor; and a module executed by the processor, the module configured to: identify use of at least one of the USB port, the Ethernet LAN port, and the wireless LAN port, and modify network access mode for one or more of the user computers based on the identification.

A further aspect of the invention involves a method of determining an operating mode in a multi-mode system for broadband wireless data communication with a wide area network over a wireless link and for use with a router for routing network communications between the wide area network and a LAN, the router including a USB port for making a USB connection with a user computer, a wired LAN port for making a wired LAN connection with a user computer, and a wireless LAN port for making a wireless LAN connection with a user computer. The method includes receiving a connection for one or more of the user computers, the connection being at least one of the USB connection, the wired LAN connection, and the wireless LAN connection; identifying use of at least one of the USB port, the wired LAN port, and the wireless LAN port based on the connection received; and modifying network access mode for the one or more user computers based on the identification.

Other features and advantages of the present invention will become more readily apparent to those of ordinary skill in the art after reviewing the following detailed description and accompanying drawings.

DETAILED DESCRIPTION OF THE INVENTION

Figure 1:
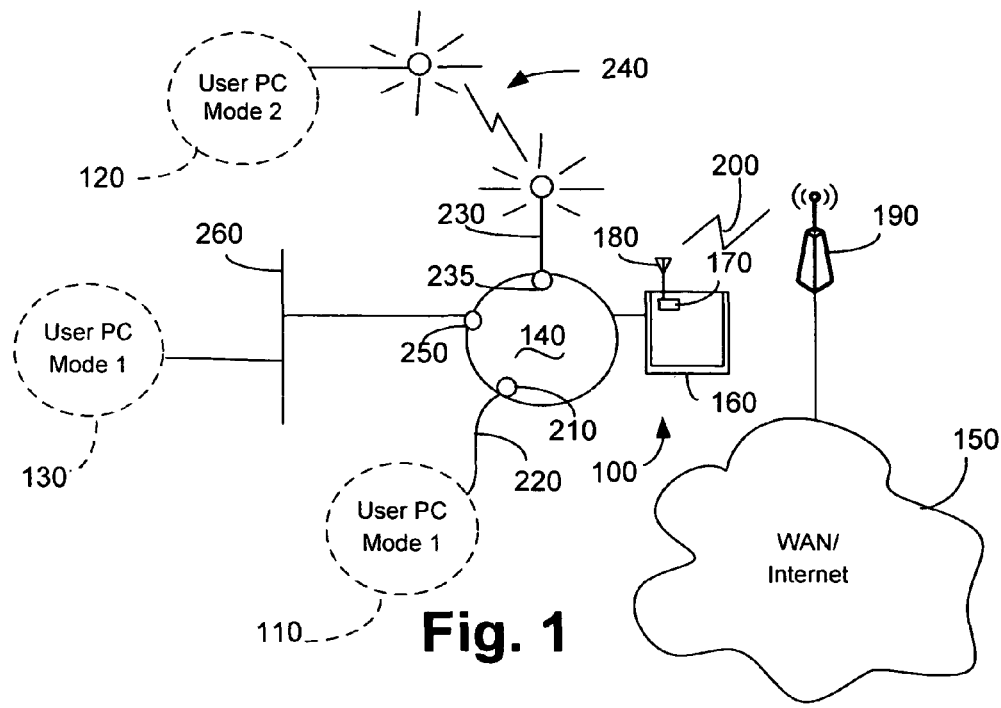
FIG. 1 is a block diagram of an embodiment of the system shown in conjunction with a user PC connected to the system through a 802.11 wireless LAN connection, a user PC connected to the system through a 100 base T LAN connection, and/or a user PC connected to the system through a USB connection. The system is shown wirelessly connected to a WAN (e.g., Internet) through an EVDO card.
Figure 2:
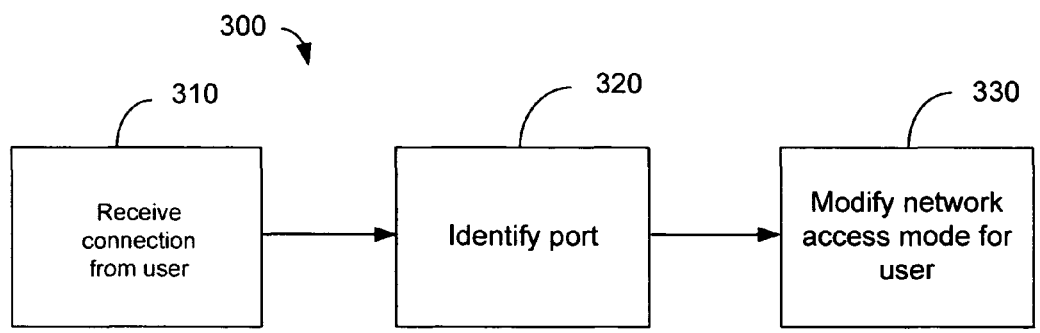
FIG. 2 is a flow diagram of an exemplary method of using the system of FIG. 1.

With reference to FIG. 1, an embodiment of a multimode EVDO/router system ("system") 100 that determines how a user PC 110, 120, 130 is accessing a router 140 to connect to Wide Area Network (WAN) 150 and then operates in a mode corresponding to how the user PC 110, 120, 130 connects to the router 140 will now be described.

In the embodiment shown, the system 100 includes an EVDO card 160 combined with a wireless router 140. The EVDO card 160 is a broadband wireless data card including a transceiver 170 coupled to an antenna 180 for communicating with base station 190 over RF link (e.g., EVDO wireless link) 200. The EVDO card 160 includes a processor and one or more modules executable by the processor to perform the functions and processes described herein. The EVDO card 160 may be part of the router 140, insertable into and/or removable from the router 140, and/or the EVDO card 160 may be a separate component connected to the router 140 (e.g., through a WAN port of the router 140 and Ethernet cable). Although the router 140 is described as having a WAN connection through an EVDO wireless link using the EVDO card 160, other wireless communication devices such as, but not limited to, a mobile phone, may be used for broadband wireless data communication between the router 140 and the base station 190.

In an alternative embodiment, instead of the system 100 including the EVDO 160 combined with the router 140, the system 100 may include the EVDO card 160, which may be used with the router 140.

The User PC 110, 120, 130 is a personal computer such as, but not by way of limitation, a laptop computer, a handheld computer, a personal digital assistant (PDA) device, a phone, and a desktop computer. The User PC 110 may be connected to a USB port 210 of the router 140 through a USB connection (e.g., USB cable) 220. The User PC 120 may be wirelessly connected to an antenna 230 and wireless LAN port 235 of the router 140 through a 802.11 wireless LAN connection 240 or similar wireless LAN connection (e.g., Bluetooth). The User PC 130 may be connected to a Ethernet LAN port 250 of the router 140 through a wired LAN connection (e.g., Ethernet cable) 260.

Although the router 140 is described as including a USB port 210, a wireless LAN port 235, and an Ethernet LAN port 250, in alternative embodiments or the router, the router 140 may have fewer ports, additional ports, and/or different ports.

With reference to FIGS. 2-5, a method 300 of using the system 100 will now be described. At step 310, the system 100 receives a connection for the User PC 110, 120, 130 from the user. For example, where the User PC 110 is connected to the router 140 through a USB connection 220, the USB port 210 receives the plug of the USB cable 220. Where the User PC 120 is wirelessly connected to the router 140 through the 802.11 wireless LAN connection 240, the system 100 recognizes when the wireless connection occurs between the User PC 120 and wireless LAN port 235. Where the User PC 130 is connected to the router 140 through a wired LAN connection 260, the Ethernet LAN port (wired LAN port) 250 receives the plug of the Ethernet cable 260.

At step 320, the port 210, 220, 235 of the router 140 where the connection occurred is identified. The system 100 may include one or more port monitor modules that identify when the port is accessed or in use. The one or more port monitor modules may be comprised of hardware (e.g., IC) and/or software (e.g., ASIC). For example, the one or more port monitor modules may be one or more software modules executed by the processor for determining which port is accessed or in use.

Although the multimode system 100 and method 300 are described as identifying the port in use to determine the mode, in alternative embodiments, the system 100 may identify connection with a User PC 110, 120, 130 in a different manner for determining what mode to put the system 100 in. For example, but not by way of limitation, each User PC 110, 120, 130 may include some form an electronic indicia (e.g., a unique signal) that the system 100 recognizes for identifying connection of a User PC 110, 120, 130 for determining what mode to put the system 100 in.

Figure 3:
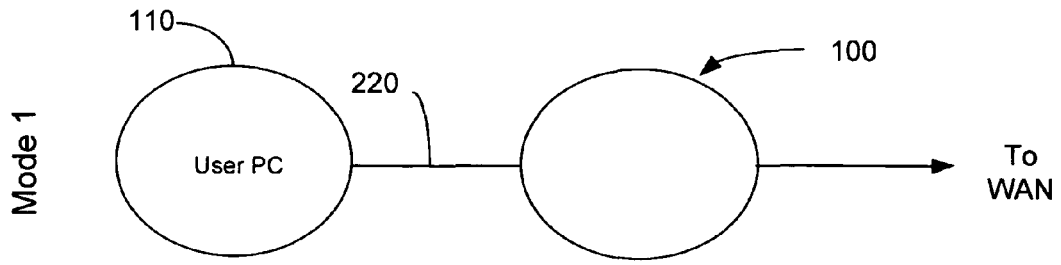
FIG. 3 is a block diagram of the system in a first mode, where a user PC is connected to the system through a USB connection.

At step 330, the network access mode ("mode") of the system 100 is modified in accordance with the port 210, 220, 235 identified as being in use. With reference to FIG. 3, if the access is through the USB port 220 via a USB connection 220 (e.g., a USB cable that doesn't go through a network card), then the system 100 operates in a first mode. In this mode, the system 100 acts as an internal/external direct connect network interface card (NIC) and functions effectively as a PC card plugged into the user PC 110.

Figure 4:
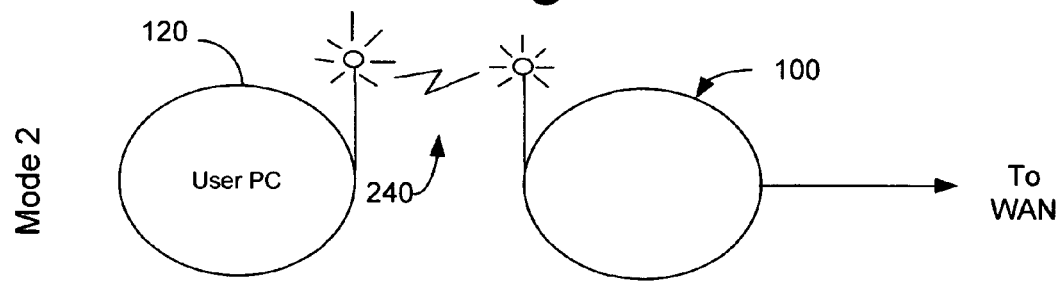
FIG. 4 is a block diagram of the system in a first mode, where a user PC is connected to the system through a 802.11 wireless connection.

With reference to FIG. 4, if the access is through the wireless LAN port 235 via a 802.11 wireless LAN connection 240, then the system 100 operates in a second mode, like a wireless router. In this mode, the system 100 functions as a network port/network pipe/WAN wireless network access point.

Figure 5:
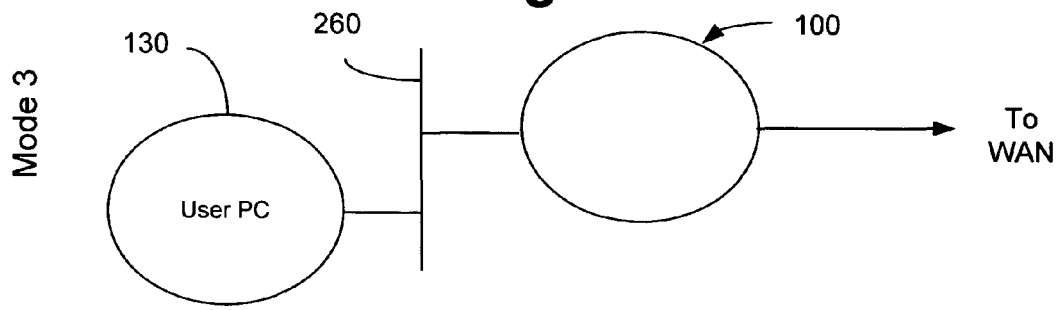
FIG. 5 is a block diagram of the system in a first mode, where a user PC is connected to the system through a 100 base T LAN connection.

With reference to FIG. 5, if the access is through the wired LAN port 250 via a wired LAN connection (e.g., Ethernet cable) 260, then the system 100 operates in a third mode, like a wired router. In this mode, the system 100 functions as a network port/network pipe/WAN wired network access point.

If more than one User PC 110, 120, 130 is connected to the system 100 at the same time, the system 100 may operate in more than one mode.

In an exemplary implementation of the system 100, to overcome the aforementioned problem of customer support when combining an EVDO card with a wireless router, the system 100 makes either an EVDO wireless carrier configuration interface or a wireless router configuration interface available to the user, depending on the system mode. The system 100 detects which port 210, 220, 235 the User PC 110, 120, 130 (this is the administrative User PC, not any User PC on the local network) is in, and provides the appropriate configuration interface (i.e. EVDO wireless carrier configuration interface or the wireless router configuration interface) based on the port 210, 220, 235 detected. The system 100 uses the wireless router configuration interface if the User PC is connected through the 802.11 wireless LAN connection 240 or the 100 base T LAN connection 260. If the user connects through the USB connection 220, the user will see an interface equivalent to the one used if the EVDO card was plugged directly into the User PC 110. As a result, if the user calls customer support for the wireless router 140, they are provided support for configuring the product if their computer is connected either by the 802.11 wireless LAN connection 240 or the 100 base T LAN connection 260. If the user calls customer support for the EVDO wireless carrier, they are provided support for configuring the product if their computer is connected by the USB connection 220. Having these two distinct modes of operation (1. EVDO wireless carrier configuration interface, 2. a wireless router configuration interface) allows users and support personnel the convenience of having a consistent user experience when the EVDO card is plugged into their PC or into their router when using the USB connection to the PC. This allows for a more positive user experience and a consistent usage model for support, utilities, and diagnostics.

Figure 6:
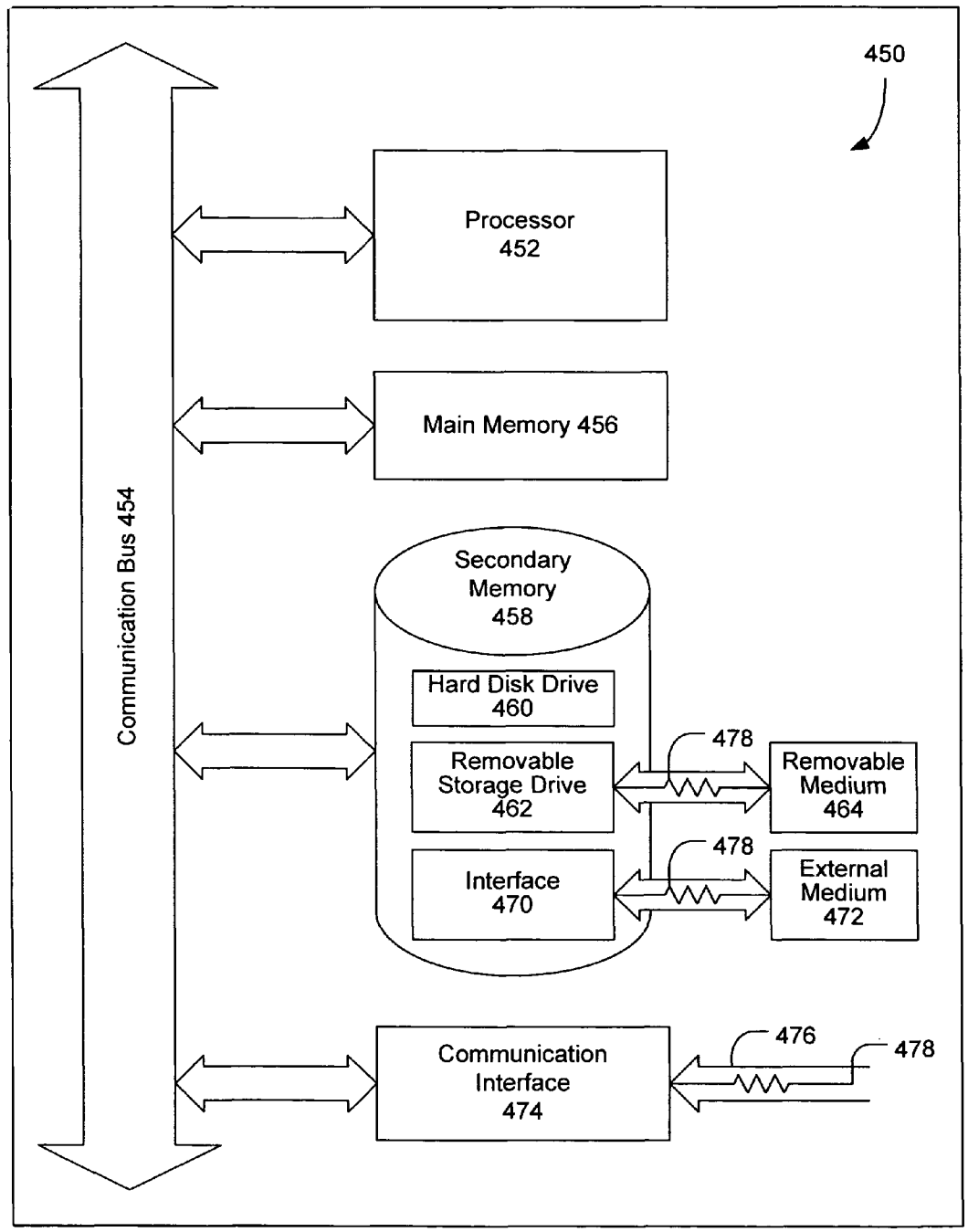
FIG. 6 is a block diagram illustrating an exemplary computer system as may be used in connection with various embodiments described herein.

FIG. 6 is a block diagram illustrating an exemplary computer system 450 that may be used in connection with the various embodiments described herein. For example, the computer system 450 may be applicable to the User PC 110, 120, 130, the router 140, and/or the EVDO card 160. However, other computer systems and/or architectures may be used, as will be clear to those skilled in the art having the benefit of this disclosure.

The computer system 450 preferably includes one or more processors, such as processor 452. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 452.

The processor 452 is preferably connected to a communication bus 454. The communication bus 454 may include a data channel for facilitating information transfer between storage and other peripheral components of the computer system 450. The communication bus 454 further may provide a set of signals used for communication with the processor 452, including a data bus, address bus, and control bus (not shown). The communication bus 454 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 450 preferably includes a main memory 456 and may also include a secondary memory 458. The main memory 456 provides storage of instructions and data for programs executing on the processor 452. The main memory 456 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 458 may optionally include a hard disk drive 460 and/or a removable storage drive 462, for example a floppy disk drive, a magnetic tape drive, a compact disc ("CD") drive, a digital versatile disc ("DVD") drive, etc. The removable storage drive 462 reads from and/or writes to a removable storage medium 464. Removable storage medium 464 may be, for example, a floppy disk, magnetic tape, CD, DVD, etc.

The removable storage medium 464 is preferably a computer readable medium having stored thereon computer executable code (i.e., software) and/or data. The computer software or data stored on the removable storage medium 464 is read into the computer system 450 as electrical communication signals 478.

In alternative embodiments, secondary memory 458 may include other similar means for allowing computer programs or other data or instructions to be loaded into the computer system 450. Such means may include, for example, an external storage medium 472 and an interface 470. Examples of external storage medium 472 may include an external hard disk drive or an external optical drive, or and external magneto-optical drive.

Other examples of secondary memory 458 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 472 and interfaces 470, which allow software and data to be transferred from the removable storage unit 472 to the computer system 450.

Computer system 450 may also include a communication interface 474. The communication interface 474 allows software and data to be transferred between computer system 450 and external devices (e.g. printers), networks, or information sources. For example, computer software or executable code may be transferred to computer system 450 from a network server via communication interface 474. Examples of communication interface 474 include a modem, a network interface card ("NIC"), a communications port, a PCMCIA slot and card, an infrared interface, and an IEEE 1394 fire-wire, just to name a few.

Communication interface 474 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 474 are generally in the form of electrical communication signals 478. These signals 478 are preferably provided to communication interface 474 via a communication channel 476. Communication channel 476 carries signals 478 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 456 and/or the secondary memory 458. Computer programs can also be received via communication interface 474 and stored in the main memory 456 and/or the secondary memory 458. Such computer programs, when executed, enable the computer system 450 to perform the various functions of the present invention as previously described.

In this description, the term "computer readable medium" is used to refer to any media used to provide computer executable code (e.g., software and computer programs) to the computer system 450. Examples of these media include main memory 456, secondary memory 458 (including hard disk drive 460, removable storage medium 464, and external storage medium 472), and any peripheral device communicatively coupled with communication interface 474 (including a network information server or other network device). These computer readable mediums are means for providing executable code, programming instructions, and software to the computer system 450.

In an embodiment that is implemented using software, the software may be stored on a computer readable medium and loaded into computer system 450 by way of removable storage drive 462, interface 470, or communication interface 474. In such an embodiment, the software is loaded into the computer system 450 in the form of electrical communication signals 478. The software, when executed by the processor 452, preferably causes the processor 452 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Those of skill in the art having the benefit of this disclosure will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A multi-mode combination broadband wireless card and router system, comprising:
    a broadband wireless card capable of providing a wireless carrier configuration interface display;
    a wireless router capable of providing a wireless router configuration interface display coupled to the broadband wireless card for routing network communications between a wide area network and a local area network (LAN) including a plurality of non-server PCs, the wireless router including a plurality of ports for coupling the plurality of non-server PCs to the wireless router, the plurality of ports including at least one of a universal serial bus (USB) port, a wired LAN port, or a wireless LAN port;
    at least one of the broadband wireless card and the wireless router including a processor and a module executed by the processor, the module configured to automatically and selectively provide to each user of each of the plurality of non-server PCs, either the wireless router configuration interface display or the wireless carrier configuration interface display, based upon a type of port coupling a PC of the plurality of non-server PC to the wireless router, the module configured to:
        identify for each non-server computer of the plurality of non-server PCs the type of port coupling each of the non-server PCs to the wireless router,
        modify a network access mode for each PC of the plurality of non-server PCs in accordance with a wireless router port identified as being in use and
        providing to a user of each of the plurality of non-server PCs, either the wireless carrier configuration interface display, or the wireless router configuration interface display to provide two distinct modes of operation based on the wireless router port identified as being in use.

2. The system of claim 1, wherein the module is configured to provide one or more of the non-server user computers a broadband wireless carrier configuration interface if at least one of the wired LAN port and the wireless LAN port is identified as being in use, and a router configuration interface if the USB port is identified as being in use.

3. The system of claim 1, wherein the wired LAN connection is a 100 base T LAN connection and the wired LAN port is an Ethernet LAN port.

4. The system of claim 1, wherein the wireless LAN connection is a 802.11 wireless LAN connection.

5. The system of claim 1, wherein the broadband wireless card is separate from the router.

6. The system of claim 1, wherein the broadband wireless card is removable and insertable with respect to the router.

7. The system of claim 1, wherein the broadband wireless card is integrated with the router.

8. The system of claim 1, wherein the broadband wireless card is an evolution data only (EVDO) card.

9. The system of claim 1, wherein the wide area network is the Internet.

10. The system of claim 1, wherein the PC of the plurality of non-server PCs is at least one of a laptop computer, a handheld computer, a personal digital assistant (PDA), a phone, or a desktop computer.

11. The system of claim 1, wherein the system includes one or more port monitors for identifying use of at least one of the USB port, the Ethernet LAN port, and the wireless LAN port.

12. A multi-mode system for broadband wireless data communication with a wide area network over a wireless link and for use with a wireless router for routing network communications between the wide area network and a local area network (LAN), the wireless router including a plurality of ports for coupling a plurality of non-server PCs including a universal serial bus (USB) port, a wired LAN port, and a wireless LAN port, the system comprising:
    a processor; and a module executed by the processor, the module configured to automatically and selectively provide to each user of each of the plurality of non-server PCs, either a wireless router configuration interface display or a wireless carrier configuration interface display, based upon a type of port coupling a PC of the plurality of non-server PCs to the wireless router, the module configured to:
        identify for each non-server computer of the plurality of non-server PCs the type of port coupling each of the non-server PCs to a wireless router port,
        modify a network access mode for each PC of the plurality of non-server PCs in accordance with the wireless router port identified as being in use; and
        providing to a user of each of the plurality of non-server PCs either the wireless carrier configuration interface display, or the wireless router configuration interface display to provide two distinct modes of operation based on the port identified as being in use.

13. The system of claim 12, wherein the system includes a broadband wireless card including the processor and the module.

14. The system of claim 13, wherein the broadband wireless card is an evolution data only (EVDO) card.

15. The system of claim 12, wherein the system includes a broadband wireless card and wireless router.

16. The system of claim 12, wherein the module is configured to provide the plurality of non-server user computers the broadband wireless carrier configuration interface if at least one of the wired LAN port and the wireless LAN port is identified as being in use, and the router configuration interface if the USB port is identified as being in use.

17. A method of determining an operating mode in a multi-mode system for broadband wireless data communication with a wide area network over a wireless link and for use with a wireless router for routing network communications between the wide area network and a local area network (LAN), the wireless router including a plurality of ports for coupling a plurality of non-server PCs including, a USB port, a wired LAN port, and a wireless LAN port, the method comprising:

receiving a connection for one or more of the user computers, the connection being at least one of a USB connection, a wired LAN connection, and a wireless LAN connection;

identifying for each non-server computer of the plurality of non-server PCs a type of port coupling each of the plurality of non-server PCs a wireless router port, based on the connection received;

modifying a network access mode for each PC of the plurality of non-server PCs in accordance with the wireless router port identified as being in use; and providing to a user of each of the plurality of non-server PCs either a wireless carrier configuration interface display, or a wireless router configuration interface display to provide two distinct modes of operation based on the port identified as being in use.

18. The method of claim 17, wherein modifying network access mode includes providing one or more of the non-server user computers with a broadband wireless carrier configuration interface if at least one of the wired LAN port and the wireless LAN port is identified as being in use, and a router configuration interface if the USB port is identified as being in use.

* * * * *